H. J. OSTDIEK & J. A. EKELUND.
FLOUR SIFTER.
APPLICATION FILED NOV. 17, 1913.

1,115,009.

Patented Oct. 27, 1914.

Witnesses.
A. H. Opsahl.
E. C. Skinkle

Inventors.
Herman J. Ostdiek
John A. Ekelund
By their Attorneys.
Williamson Merchant

UNITED STATES PATENT OFFICE.

HERMAN J. OSTDIEK AND JOHN A. EKELUND, OF MINNEAPOLIS, MINNESOTA.

FLOUR-SIFTER.

1,115,009.  Specification of Letters Patent.  Patented Oct. 27, 1914.

Application filed November 17, 1913. Serial No. 801,331.

*To all whom it may concern:*

Be it known that we, HERMAN J. OSTDIEK and JOHN A. EKELUND, citizens of the United States, residing at Minneapolis, in the county of Hennepin and State of Minnesota, have invented certain new and useful Improvements in Flour-Sifters; and we do hereby declare the following to be a full, clear, and exact description of the invention, such as will enable others skilled in the art to which it appertains to make and use the same.

Our invention has for its object to provide a flour sifter, and to such ends, generally stated, the invention consists of the novel devices and combinations of devices hereinafter described and defined in the claims.

Ordinary flour, as is well known, is very finely ground, and when it stands in a sack or barrel, becomes very solidly packed. The chief function performed by the flour sifter, such as used in the kitchen, is to loosen up the flour and make it fluffy and light, so that it is better adapted for use in baking, and especially for use in baking cakes and pastries. The sifting of the flour loosens up the flour and aerates the same and temporarily makes it light. The ordinary flour sifter relies simply on the sifting of the flour to produce this action. We have found, however, that by providing the sifting reel not only with blades for engagement with the sieve surface, but also with auxiliary agitating blades arranged to pass through the flour between the sieve surface and the axis of the reel, the entire body of flour contained within the sifter will be continuously stirred up, loosened and mixed with the air, so that the loosening and aeration of the flour in the act of sifting is very greatly facilitated. In fact, we have found that flour once run through this improved sifter will be as well aerated and lightened, as the same flour run five or six times through an ordinary sifter.

In the accompanying drawings which illustrate the invention, like characters indicate like parts throughout the several views.

Figure 2:
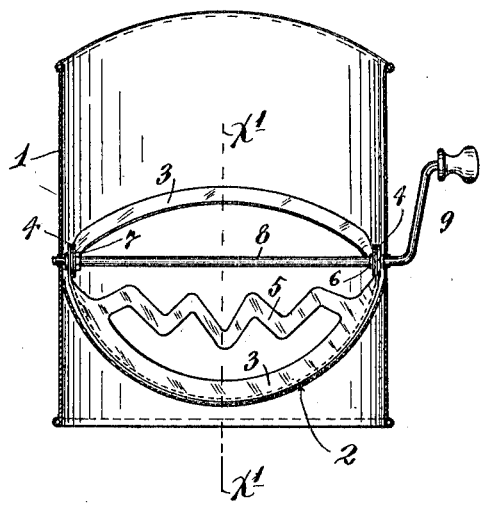
Figure 1:
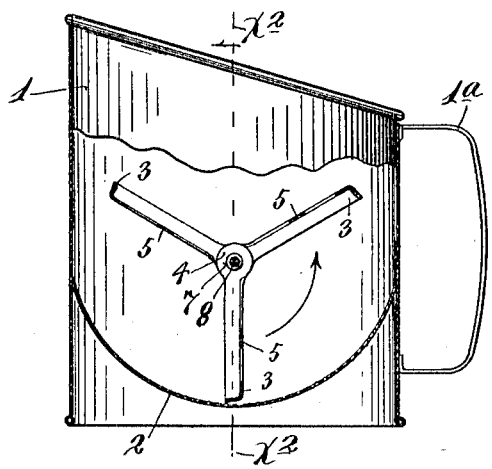
Figure 3:
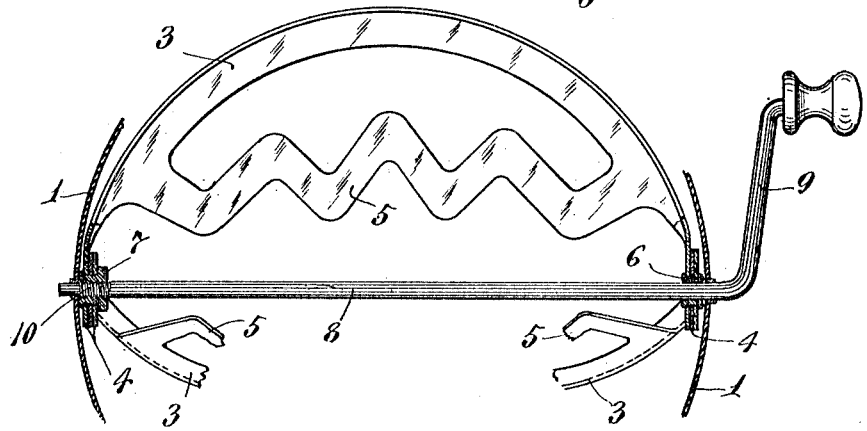

Referring to the drawings: Figure 1 is a view partly in side elevation and partly in vertical section on the line $x^1$ $x^1$ on Fig. 2, showing the improved sifter; Fig. 2 is a vertical section taken on the line $x^2$ $x^2$ on Fig. 1; and Fig. 3 is an enlarged horizontal section of the sifter, some parts being broken away.

Referring to the drawings, the numeral 1 indicates the cup or shell of the sifter, the same, as shown, being of cylindrical form and having the customary semi-spherical screen bottom 2 and suitable handle $1^a$. The sifting reel which works within the cup may be made up of any desired number of blades, but, as shown in the drawings, it is made up of three blades, each of which blades is a duplicate of the other, and pressed or otherwise formed from a single piece of sheet metal. The bodies 3 of these reel blades are segmental or approximately semi-circular, so that the outer edges closely fit the inner or upper surface of the screen bottom 2. In cross section, the said blades 3 are angular or approximately L-shaped, but at the angle are curved so that the outer flange thereof, when the reel is rotated in the direction of the arrow marked on Fig. 1, will have a downwardly pressing action tending to force the flour through the screen bottom 2. The ends of the blades 3 terminate in perforated ears 4 having alined axes. Each blade 3 is formed with a transverse agitating bar 5 that extends on a chord of the arc of the blade 3, in a general direction approximately parallel to the axes of the alined lugs 4. These agitating bars 5, instead of being made straight, are preferably made zigzag, so that they will more thoroughly agitate and stir up the flour which is within the cup 1 but above the screen bottom 2.

The perforated lugs 4 of the several blades 3 are overlapped with the axial perforations alined or co-incident, and they are connected, preferably by bushings or tubular rivets 6 and 7. These bushings 7, when properly upset, will securely hold the several blades 3 properly spaced circumferentially of the reel, but if found desirable, a little solder may be applied to the said overlapped ears 4. The bushing 6 is preferably made with a smooth bore, but the bushing 7 is preferably made heavier and internally threaded. The rod or stem 8 of the operating crank 9 is passed loosely through the bushing 6 and at one end, is screw-threaded at 10 for engagement with the bushing 7. The end of the crank shaft 8 projects beyond the end portion 10 to afford a trunnion that projects through a suitable perforation in one side of the cup 1. The said crank shaft 8 is also passed through another perforation in the diametrically opposite side of the cup 1. It is, of course, evident, that when the crank shaft is screwed as far as it will go into the bushing 7 of the reel, by rotation of the reel in the direction of the arrow, Fig. 1, the reel then becomes secured to the said shaft for rotation in that direction, and that the said shaft may be separated from the said reel by rotation in the reverse direction while the reel is held against rotation.

Each blade of the reel may be stamped by a single die and any desired number of the blades may be assembled on a single reel. The reel is a very substantial structure, and at the same time, may be very cheaply constructed.

When the reel is rotated to sift the flour contained in the cup, the flour will be continuously raised and precipitated by the auxiliary blades 5 and will be continuously forced downward through the sieve 2 by the main blades 3. In this way, the flour is loosened up, aerated and made light by an operation which takes place in the cup itself, and the completion of this operation is produced by sifting the flour through the screen.

The efficiency of the improved sifter has been demonstrated in actual practice.

What we claim is:

1. In a flour sifter, the combination with a receptacle having an approximately semispherical screen bottom, of a reel working within said receptacle and having main and auxiliary blades, the said main blades working over the said sieve surface, and said auxiliary blades being attached to said main blades at their ends, and extending in the general direction of the chords thereof, approximately parallel to the axis of said reel.

2. In a flour sifter, the combination with a receptacle having an approximately semispherical screen bottom, of a reel working within said receptacle and having main and auxiliary blades, the said main blades working over the said sieve surface, and said auxiliary blades being attached to said main blades at their ends, and extending in the general direction of the chords thereof, approximately parallel to the axis of said reel, the said main blades being formed integral, and the former having backwardly turned flanges that work directly over the said screen bottom.

3. In a flour sifter, the combination with a receptacle having an approximately semispherical screen bottom, of a reel working within said receptacle and having main and auxiliary blades, the said main blades working over the said sieve surface, and said auxiliary blades being attached to said main blades at their ends, and extending on zigzag lines in the general direction of the chords thereof.

In testimony whereof we affix our signatures in presence of two witnesses.

HERMAN J. OSTDIEK.
JOHN A. EKELUND.

Witnesses:
H. D. KILGORE,
F. D. MERCHANT.